United States Patent
Kim et al.

(10) Patent No.: US 7,126,576 B2
(45) Date of Patent: *Oct. 24, 2006

(54) BACKLIGHT ASSEMBLY AND LIQUID CRYSTAL DISPLAY DEVICE USING THE SAME

(75) Inventors: Min-Gyu Kim, Seoul (KR); Jong-Dae Park, Seoul (KR); Jeong-Hwan Lee, Suwon-si (KR); Sang-Hoon Lee, Yongin-si (KR); Byung-Woong Han, Incheon-si (KR); Hyoung-Joo Kim, Uiwang-si (KR); Dong-Hoon Kim, Suwon-si (KR)

(73) Assignee: Samsung Electronics Co., Ltd.(KR)

( * ) Notice: Subject to any disclaimer, the term of this patent is extended or adjusted under 35 U.S.C. 154(b) by 368 days.

This patent is subject to a terminal disclaimer.

(21) Appl. No.: 10/631,335

(22) Filed: Jul. 30, 2003

(65) Prior Publication Data

US 2004/0174333 A1  Sep. 9, 2004

(30) Foreign Application Priority Data

Mar. 3, 2003  (KR) ...................... 10-2003-0013182

(51) Int. Cl.
*G09G 3/36* (2006.01)
(52) U.S. Cl. .................... 345/102; 345/87; 345/95; 345/104

(58) Field of Classification Search .......... 345/87–104, 345/204–215
See application file for complete search history.

(56) References Cited

U.S. PATENT DOCUMENTS

| | | | | |
|---|---|---|---|---|
| 5,739,803 | A * | 4/1998 | Neugebauer | 345/98 |
| 6,297,791 | B1* | 10/2001 | Naito et al. | 345/89 |
| 2004/0174332 | A1* | 9/2004 | Kim et al. | 345/102 |
| 2004/0174333 | A1* | 9/2004 | Kim et al. | 345/102 |
| 2005/0093463 | A1* | 5/2005 | Jang et al. | 315/160 |

\* cited by examiner

*Primary Examiner*—Vijay Shankar
(74) *Attorney, Agent, or Firm*—Cantor Colburn LLP

(57) ABSTRACT

In a backlight assembly and a liquid crystal display device using the backlight assembly, a lamp assembly is mounted on a receiving container and includes lamps. The lamps are connected in parallel and are turned on by the power voltage supplied from a lamp driving module. Sensors are disposed in the receiving container to face the lamps, and detect operation state of the lamps to output sensing signals. A voltage cut-off module is disposed outside of the receiving container, provides the lamp driving module with a voltage cut-off signal when at least one of the sensing signals has an amplitude smaller than a reference signal. The deterioration of the lamps may be prevented, and the life expectancy of lamps may be increased.

22 Claims, 10 Drawing Sheets

BACKLIGHT ASSEMBLY AND LIQUID CRYSTAL DISPLAY DEVICE USING THE SAME

CROSS-REFERENCE TO RELATED APPLICATIONS

This application relies for priority upon Korean Patent Application No.2003-13182 filed on Mar. 3, 2003, the contents of which are herein incorporated by reference in its entirety.

BACKGROUND OF THE INVENTION

1. Field of the Invention

The present invention relates to a backlight assembly and liquid crystal display device using the same.

2. Description of the Related Art

A liquid crystal display (LCD) device is a flat panel display device and display an image by means of liquid crystal. The liquid crystal changes a transmissivity of light passing through the liquid crystal according to an electric field applied to the liquid crystal.

However, since the liquid crystal is not able to generate light, the liquid crystal display device employs lamps so as to display images under dark environment. The liquid crystal display device having a small screen size employs one or two lamps so as to display images.

According as the screen size of the liquid crystal display device increases, the liquid crystal display device employs a plurality of lamps, for example 10~20 lamps. In addition, some liquid crystal display device employs lamps arrange in parallel.

However, when the liquid crystal display device employs a plurality of lamps, the cost for manufacturing the liquid crystal display device, the weight and size of the liquid crystal display device greatly increases since the number of lamp driving apparatus also increase according to the increase of the number of the lamps.

In order to reduce the number of the lamp driving apparatus, the liquid crystal display device employs the lamps, each of which is parallel connected, arranged in parallel and one or two lamp driving apparatus for turning on or turning off the lamps simultaneously.

The conventional liquid crystal display device may reduce the number of the lamp driving apparatus, but the life expectancy of the other lamps except broken lamps may be reduced and the other lamps may be damaged because over current may be flow through the other lamps when one of the lamps are broken down.

SUMMARY OF THE INVENTION

Accordingly, it is one aspect of the present invention to provide a backlight assembly, which detects the operation state of the lamps connected in parallel and turns off all of the lamps as to protects the lamps when at least one of the lamps operates abnormally.

It is another aspect of the present invention to provide a liquid crystal display device having the backlight assembly.

In one aspect of the present invention, there is provided a backlight assembly comprising a lamp assembly, a receiving container, a plurality of sensors and an inverter. The lamp assembly includes a plurality of lamps, arranged in parallel, for generating a light. A power voltage is applied to the lamps through the lamp assembly. The receiving container receives the lamp assembly, and the receiving container includes a bottom face and side faces. The sensors are disposed in the receiving container and detect an operation state of the lamps to output a plurality of sensing signals. One of the sensors faces a respective lamp. The inverter includes i) a lamp driving module, disposed outside the receiving container, for providing the lamps with the power voltage, ii) voltage cut-off module comparing the sensing signals with a predetermined reference signal. The voltage cut-off module provides the lamp driving module with a voltage cut-off signal to prevent the lamp driving module from providing the lamps with the power voltage when at least one of the sensing signals has an amplitude smaller than the reference signal.

In another aspect of the present invention, there is provided a liquid crystal display device comprising a backlight assembly, an inverter and a liquid crystal display panel. The backlight assembly includes i) a lamp assembly having a plurality of lamps, arranged in parallel, for generating a light, ii) a plurality of sensors for detecting an operation state of the lamps to output a plurality of sensing signals. A power voltage is applied to the lamps through the lamp assembly. One of the sensors faces a respective lamp. The inverter provides the lamps with the power voltage to turn on the lamps, compares the sensing signals with a predetermined reference signal, and outputs a voltage cut-off signal to prevent the power voltage from being applied to the lamps when at least one of the sensing signals has an amplitude smaller than the reference signal. The liquid crystal display panel changes the light into an image and displays the image.

According to the present invention, the sensors detects the operation state of the lamps parallel connected and turns off all of the lamps when at least one of the lamps operates abnormally, to thereby prevent the breakdown of the lamps, the reduction of the life expectancy of the lamps.

BRIEF DESCRIPTION OF THE DRAWINGS

The above and other features and advantages of the present invention will become more apparent by describing in detail the preferred embodiments thereof with reference to the accompanying drawings, in which.

DESCRIPTION OF PREFERRED EMBODIMENTS

Hereinafter preferred embodiment of the present invention will be described in detail with reference to the accompanying drawings.

<Embodiment 1 of Backlight Assembly>

Figure 1:
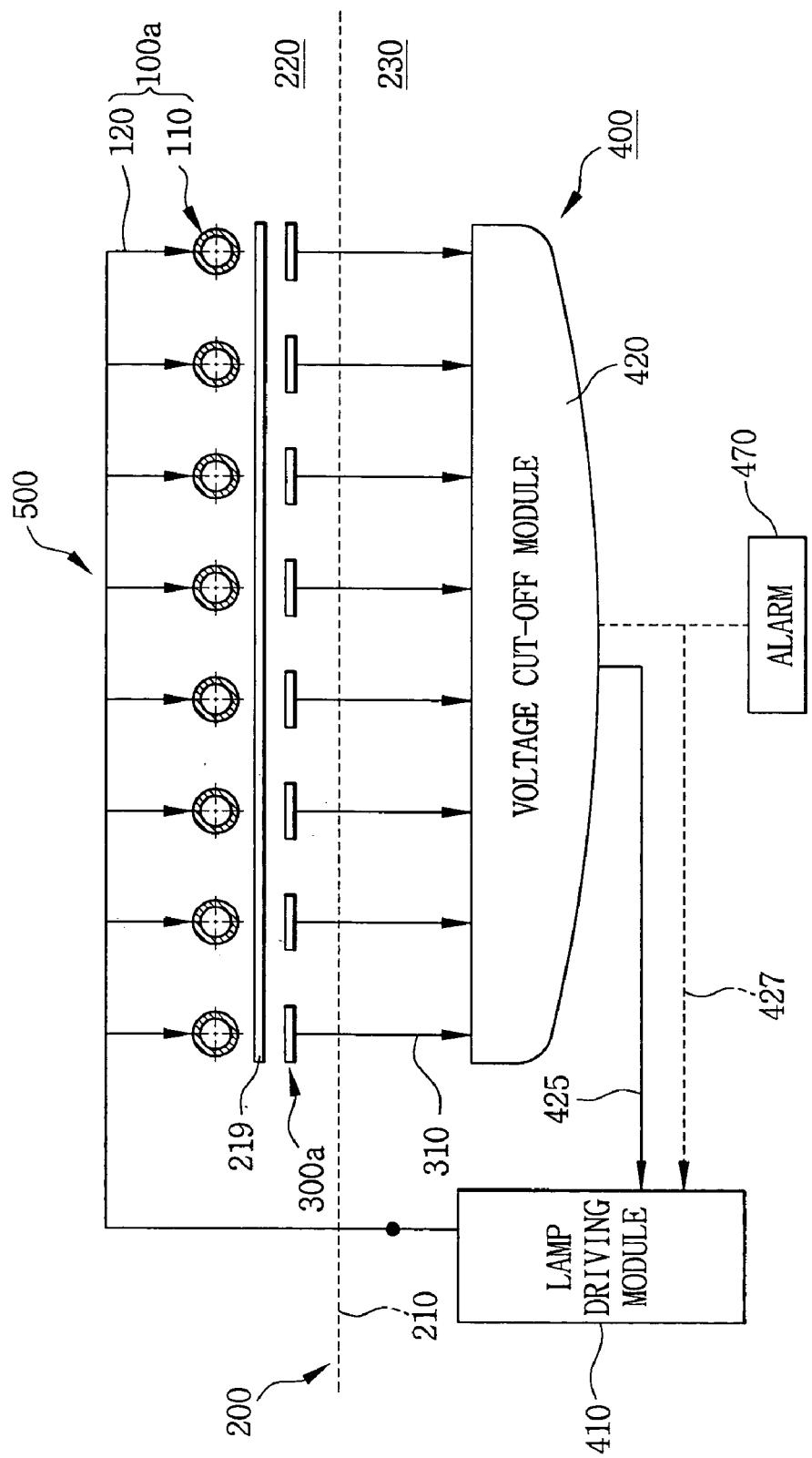
FIG. 1 is a schematic view showing a backlight assembly according to a first exemplary embodiment of the present invention.

FIG. 1 is a schematic view showing a backlight assembly according to a first exemplary embodiment of the present invention. The backlight assembly according to the first exemplary embodiment of the present invention is employed in display device such as liquid crystal display device, display panel for displaying an advertisement message, projection television etc.

Referring to FIG. 1, the backlight assembly 500 includes a lamp assembly 100a, a receiving container 200, a plurality of sensors 300a and an inverter 400.

The lamp assembly 100a includes a plurality of lamps 110 and a module 120.

Each of the lamps 110 is arranged in parallel with each other. Each of the lamps 110 receives power voltage generated from the inverter 400 through the module 120, and generates light.

The lamps 110 are connected in parallel to the module 160. The module 160 includes a first module 140 and a second module 150. The power voltage is applied to the lamps 110 through the module 160. The lamps 110 are simultaneously turned on or turned off by the power voltage. Operation characteristics (for example, brightness) of a lamp is deteriorated in proportional to total periods during which the lam is substantially turn on, and does not operates when the period reaches a life expectancy of the lamp.

The receiving container 200 provides a receiving space. The receiving container 200 includes a bottom face 410. The bottom face 210 forms the boundary between an external region 230 and an internal region 220. The lamp assembly 100a and sensors 300a are received in the internal region 220, and the inverter 200 is disposed in the external region 230.

The module 120 of the lamp assembly 100a is disposed on the bottom face 210 of the receiving container 200, and the sensors 300a are disposed between the bottom face 210 and the lamps 110 such that each of the sensors 300a is disposed under each of the lamps 110. Each of the sensors 300a detects the operation state of each of the lamps 100 and generates a sensing signal 310.

The inverter 400 may be installed on an outer surface of the bottom face 210 of the receiving container 200. The inverter 400 includes a lamp driving module 410 and a voltage cut-off module 420.

The lamp driving module 410 generates the power voltage for turning on the lamps 110, and the power voltage is applied to the module 120 of the lamp assembly 100.

The voltage cut-off module. 420 receives the sensing signal 310 outputted from the sensors 300a and prevents the power voltage from being applied to the lamps 110 according to the sensing signal 310. The voltage cut-off module 420 compares a reference signal level and the signal level of the sensing signal 310, and determines whether or not to apply the power voltage to the lamps 110.

For example, the voltage cut-off module 420 provides the lamp driving module 410 with a voltage supply signal 425 so that the lamp driving module 410 applies the power voltage to the lamps 110 when all of the signal levels of the sensing signal are larger than the reference signal levels. Accordingly, all of the lamps 110 are turned on by the power voltage applied from the lamp driving module 410.

The voltage cut-off module 420 provides the lamp driving module 410 with the voltage cut-off signal 427 so that the lamp driving module 410 does not apply the power voltage to the lamps 110 when at least one signal levels of the sensing signals 310 are smaller than the reference signal levels. Accordingly, all of the lamps 110 are turned off by the lamp driving module 410 in order to prevent an overcurrent from flowing into the lamps 110 that operates normally.

A reflection plate 219 may be further installed between the lamp assembly 100a and the bottom face 210 of the receiving container 200. The reflection plate 219 reflects the light generated from the lamps 110.

According to above embodiment, the lamp driving module 410 turns on or turns off the lamps 110 operating normally when at least one lamp operates abnormally, for example, when the operation characteristic (for example, the brightness) of at least one lamp is deteriorated or when at least one lamp is turned off. Therefore, the lamps operating normally may be protected from the overcurrent flowing threreinto.

<Embodiment 2 of Backlight Assembly>

Figure 2:
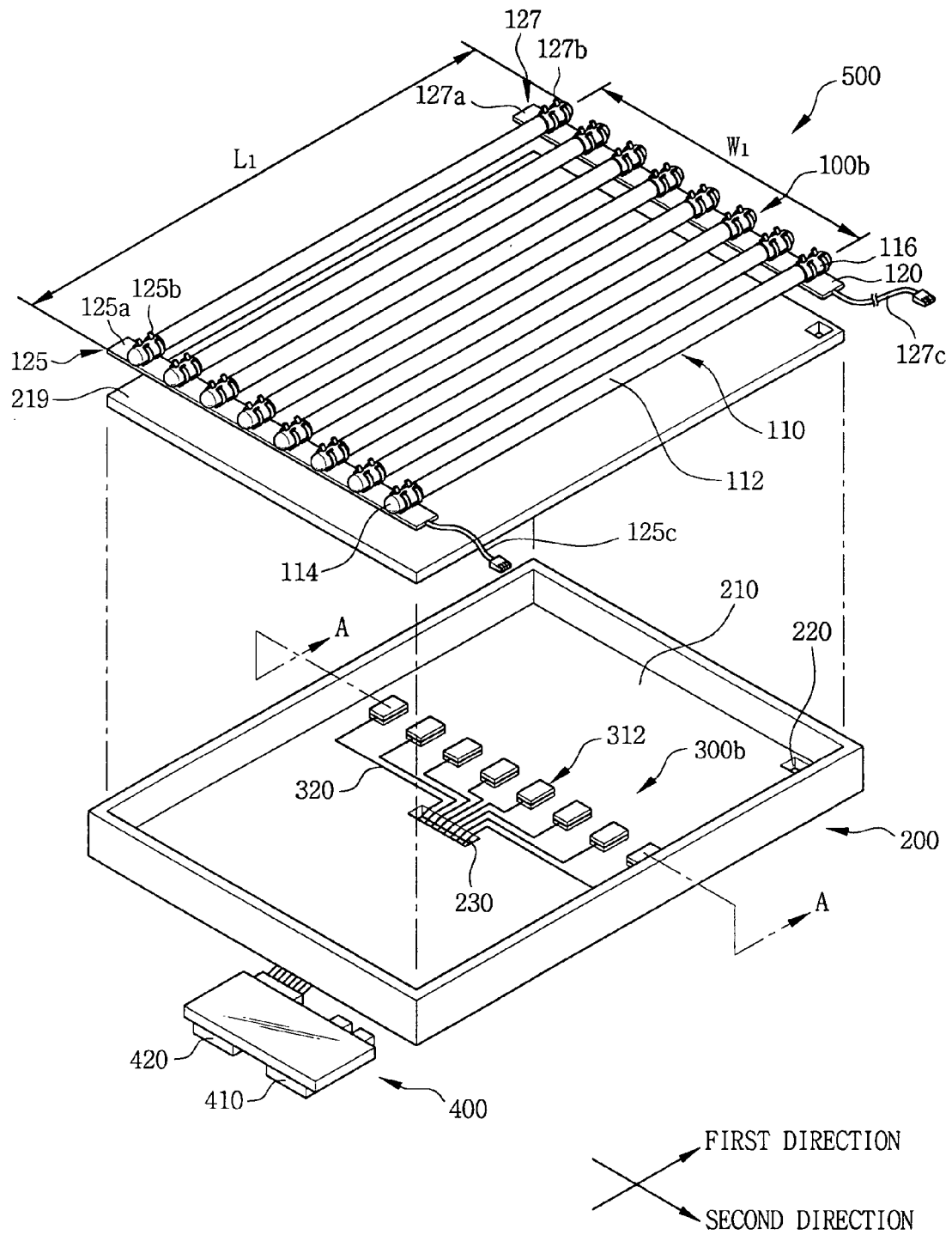
FIG. 2 is an exploded perspective view showing a backlight assembly according to a second exemplary embodiment of the present invention.
Figure 3:
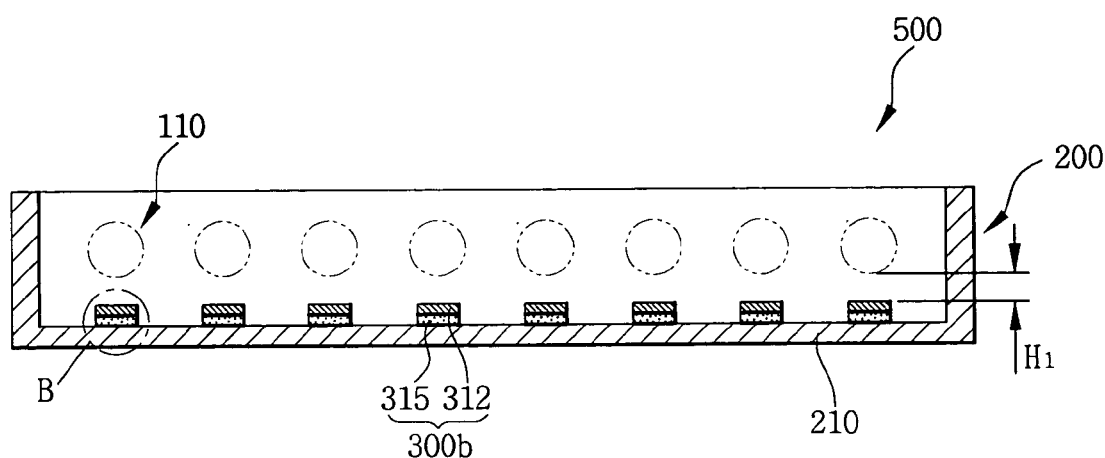
FIG. 3 is cross-sectional view taken along the line A—A of FIG. 2.
Figure 4:
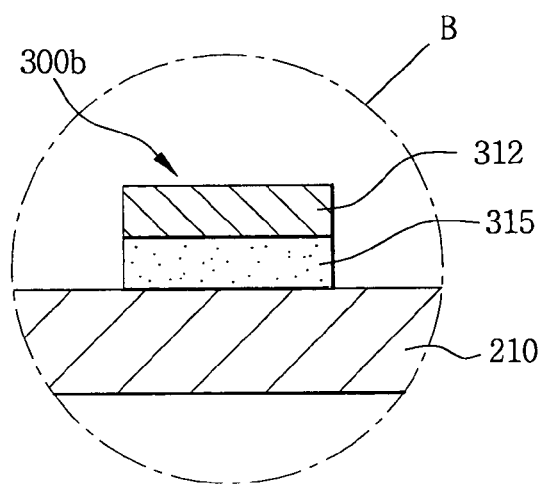
FIG. 4 is an enlarged view taken of a portion B of FIG. 3.

FIG. 2 is an exploded perspective view showing a backlight assembly according to a second exemplary embodiment of the present invention, FIG. 3 is cross-sectional view taken along the line A—A of FIG. 2, and FIG. 4 is an enlarged view taken of a portion B of FIG. In the embodiment 2 of the backlight assembly, other elements except the lamp assembly and the sensors are the same as those of the embodiment 1 of the backlight assembly, the same reference numerals denote the same elements of embodiment 1 of the backlight assembly, and thus the detailed descriptions of the same elements will be omitted.

Referring to FIG. 2, the lamp assembly 100b includes a plurality of lamps 110 and a module 120.

Each of the lamps 110 includes a lamp body 112, a first electrode 114 and a second electrode 116. The first electrode 114 is disposed at a first end of the lamp body 112, and the second electrode 116 is disposed at a second end of the lamp body 112. The second end of the lamp body 112 faces the first end of the lamp body 112. At least on electrode of the first and second electrodes 114 and 116 may be an external electrode disposed on an outer surface of the lamp body 112. For example, as shown in FIG. 2, the first and second electrode 114 and 116 may be both external electrodes.

At least two lamps are arranged in parallel. Hereinafter, L1 is referred to as a length of each of the lamps, and W1 is referred to as the total width of the lamps 110.

The lamps 110 are connected in parallel to the module 120. The module 120 includes a first module 125 and a second module 127. The first module 125 is parallel connected to the first electrodes 114 of the lamps 110 arranged in parallel, and the second module 127 is parallel connected to the second electrodes 116 of the lamps 110.

The first module 125 includes a first conductive plate 125a and a first clip (or clamp) 125b. The first clip 125b fixes the first electrodes 114. The second module 127 includes a second conductive plate 127a and a second clip 127b. The second clip 127b fixes the second electrodes 116. A first power line 125c is connected to the first module 125, and a second power line 127c is connected to the second module 127.

The first and second power line 125c and 127c is drawn out outside the receiving container 200 through opening 220 formed on the bottom face 210 of the receiving container 200.

Referring to FIGS. 2, 3 and 4, the sensors 300b is disposed on the bottom face 210 of the receiving container 200. Each of the sensors 300b includes a conductive member 312 and a signal line 320.

The conductive member 312 may be a thin metal plate comprised of copper. A plurality of conductive members 312 is disposed on the bottom face 210 of the receiving container 200 to be disposed under each of the lamps 110. A magnetic field generated from the lamps 110 induces a current on the conductive member 312 according to an electromagnetic induction phenomenon. The conductive member 312 detects the operation state of the lamps 110 and outputs the induced current as a sensing signal 310.

The sensing signal 310 is outputted from the conductive member 312 and is transferred to the inverter 400 through the signal line 320. A first end of the signal line 320 is connected to the conductive member 312, and a second end of the signal line 320 is connected to the inverter 400. The second end of the signal line 320 faces the first end of the signal line 320.

Referring to FIG. 4, when the receiving container 200 comprises a metal, the conductive member 312 is electrically connected to the receiving container 200, to thereby form a short circuit. Therefore, the sensing signal outputted from the conductive member 312 is not transferred to the inverter 400. To prevent above problem, the conductive member 312 is electrically insulated from the receiving container 200. For example, an insulation member 315 may be further installed between the conductive member 312 and the receiving container 200 so as to insulate the conductive member 312 from the receiving container 200. For example, the insulation member 315 may be an insulation tape that has high resistivity and adhesive property so as to adhere the conductive member 312 to the receiving container 200.

Each of the conductive members 312 detects a magnetic flux generated from each of the lamps 110 so as to detect the operation state of each of the lamps 110. A distance H1 between the lamp and the conductive member disposed under the lamp affects the magnetic flux.

According to experiments, when the distance between an outer surface of a lamp and a sensor is smaller than about 1 mm or larger than about 5 mm, the precision of the sensing signal 310 is very low, so that the sensing signal 310 may not be detected with a high precision. For example, in order to detect the sensing signal 310 with a high precision, the distance H1 may be in a range from about 1 mm to about 5 mm.

The signal line 320 is drawn out outside the receiving container 200 through an opening 230 formed on the bottom face 210 of the receiving container 200.

<Embodiment 3 of Backlight Assembly>

Figure 5:
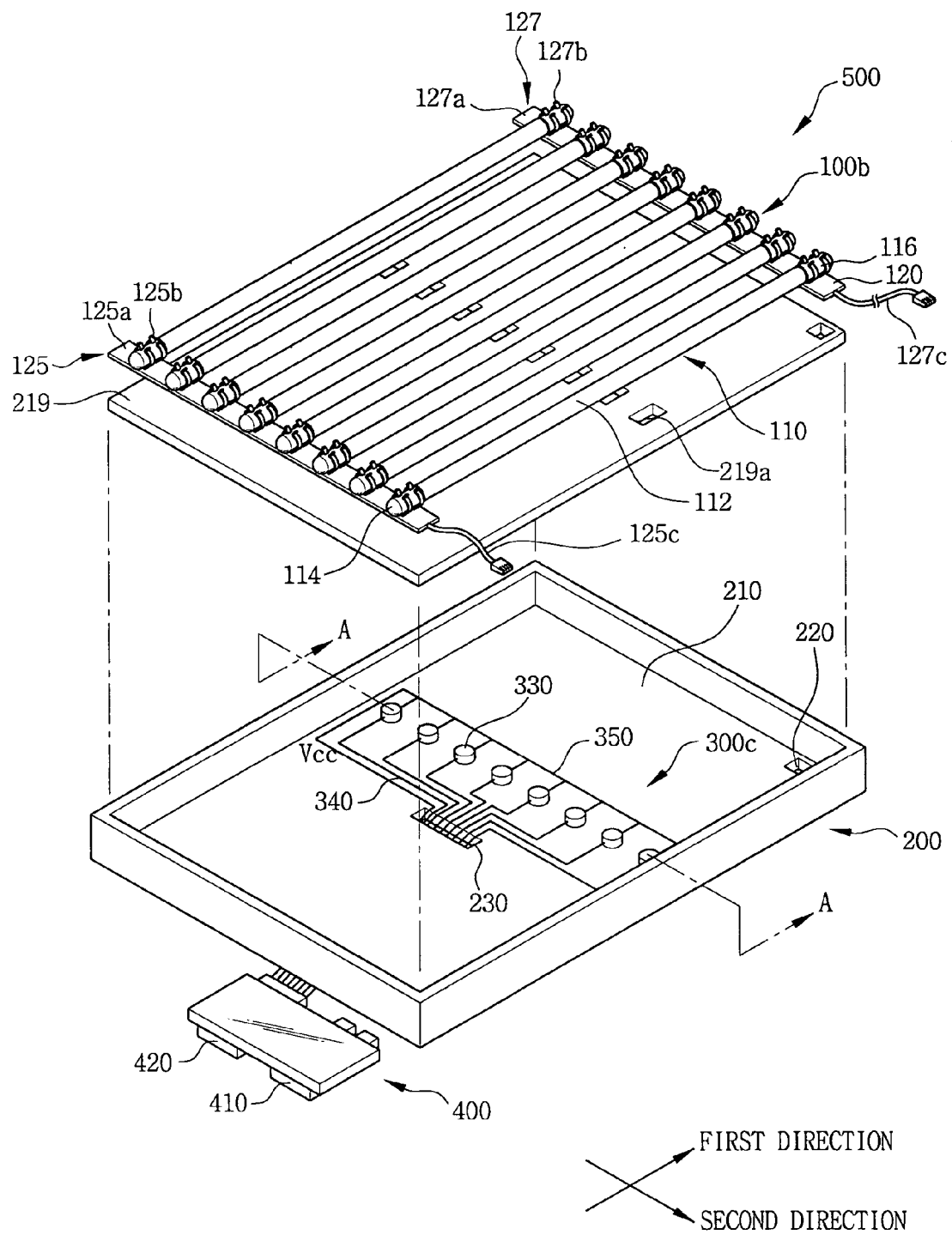
FIG. 5 is an exploded perspective view showing a backlight assembly according to a third exemplary embodiment of the present invention.

FIG. 5 is an exploded perspective view showing a backlight assembly according to a third exemplary embodiment of the present invention. In the embodiment 3 of the backlight assembly, other elements except the reflection plate and sensors are the same as those of the embodiment 2 of the backlight assembly, the same reference numerals denote the same elements of embodiment 2 of the backlight assembly, and thus the detailed descriptions of the same elements will be omitted.

Referring to FIG. 5, each of the sensors 300c includes a photoelectric device 330, a first signal line 340 and a second signal line 350.

Each of the photoelectric devices 330 is disposed on a bottom face 210 of a receiving container 200 to be disposed under each of the lamps 110. There is a one-to-one correspondence between the photoelectric devices and the lamps.

Each of the photoelectric devices 330 includes a first electrode as an input terminal and a second electrode as an output terminal. A power voltage Vcc is applied to the first electrode through the second signal line 350. A first end of the first signal line 340 is connected to the second electrode of the photoelectric device 330, and a second end of the first signal line 340 is connected to the voltage cut-off module 420 of the inverter 400. The second end of the first signal line 340 faces the first end of the first signal line 340.

The photoelectric device, for example, may be a phototransistor or a photodiode. The phototransistor or the photodiode generates a voltage signal in response to the light generated from the lamp.

When the photoelectric device 330 is a phototransistor, for example, the first electrode may be an emitter electrode of the phototransistor, and the second electrode may be a collector electrode of the phototransistor. When the light of which intensity is larger than a predetermined value is applied to the base electrode of the phototransistor, the threshold voltage of the phototransistor is lowered, and current is able to flow from the emitter electrode to the collector electrode. Accordingly, the sensing signal 310 is outputted from the collector electrode.

In case the photoelectric device 330 is a photodiode, when a reverse voltage is applied to the PN junction of the photodiode and the light of which intensity is larger than a predetermined value is incident into the PN junction, the photodiode is turned on to output the sensing signal 310.

A reflection plate 219 includes a plurality of openings 219a, and one of the openings 219a is disposed over the respective photoelectric device 330 so that the photoelectric devices 330 may detect the light generated from each of the lamps 110.

The lights generated from the lamps 110 have different brightness depending on the operation states of the lamps 110. The lamp operating normally generates a light having a higher brightness than the lamp operating abnormally, or the lamp having a deteriorated operation characteristic. The lamp operating abnormally or the lamp having a deteriorated operation characteristic generates a light having a low brightness. The lights generated from the lamps 110 having different operation states is incident into each of the photoelectric devices 330, each of the photoelectric devices 330 generates different sensing signal depending on the brightness of the light generated from the lamps 110. The sensing signal generated from each of the photoelectric devices 330 is applied to the inverter 400.

The voltage cut-off module 420 of the inverter 400 compares the reference signal level and the signal level of the sensing signal 310, and provides the lamp driving module 410 with the voltage cut-off signal 427 so that the lamp driving module 410 does not apply the power voltage to the lamps 110 when at least one signal levels of the sensing signals 310 are smaller than the reference signal levels. Accordingly, all of the lamps 110 are turned off by the lamp driving module 410 in order to prevent overcurrent from flowing into the lamps that operates normally.

An alarm (not shown) may start an alarm operation in response to the voltage cut-off signal 427 when at least one lamp operates abnormally. The alarm may alarm with a voice or a sound.

According to above embodiment, the sensors detects the light generated from the lamps, and the lamp driving module 410 turns off the lamps 110 operating normally when at least one lamp operates abnormally, for example, when the operation characteristic (for example, the brightness) of at least one lamp is deteriorated or when at least one lamp is turned off. Therefore, the lamps operating normally may be protected from the overcurrent flowing threreinto.

In addition, according to above embodiment, the sensors detect the light generated from the lamps so as to detect the operation state of the lamps rather than the magnetic flux generated from the lamps. Therefore, the limitation of the distance between the lamp and the sensor may not be required.

<Embodiment 4 of Backlight Assembly>

Figure 6:
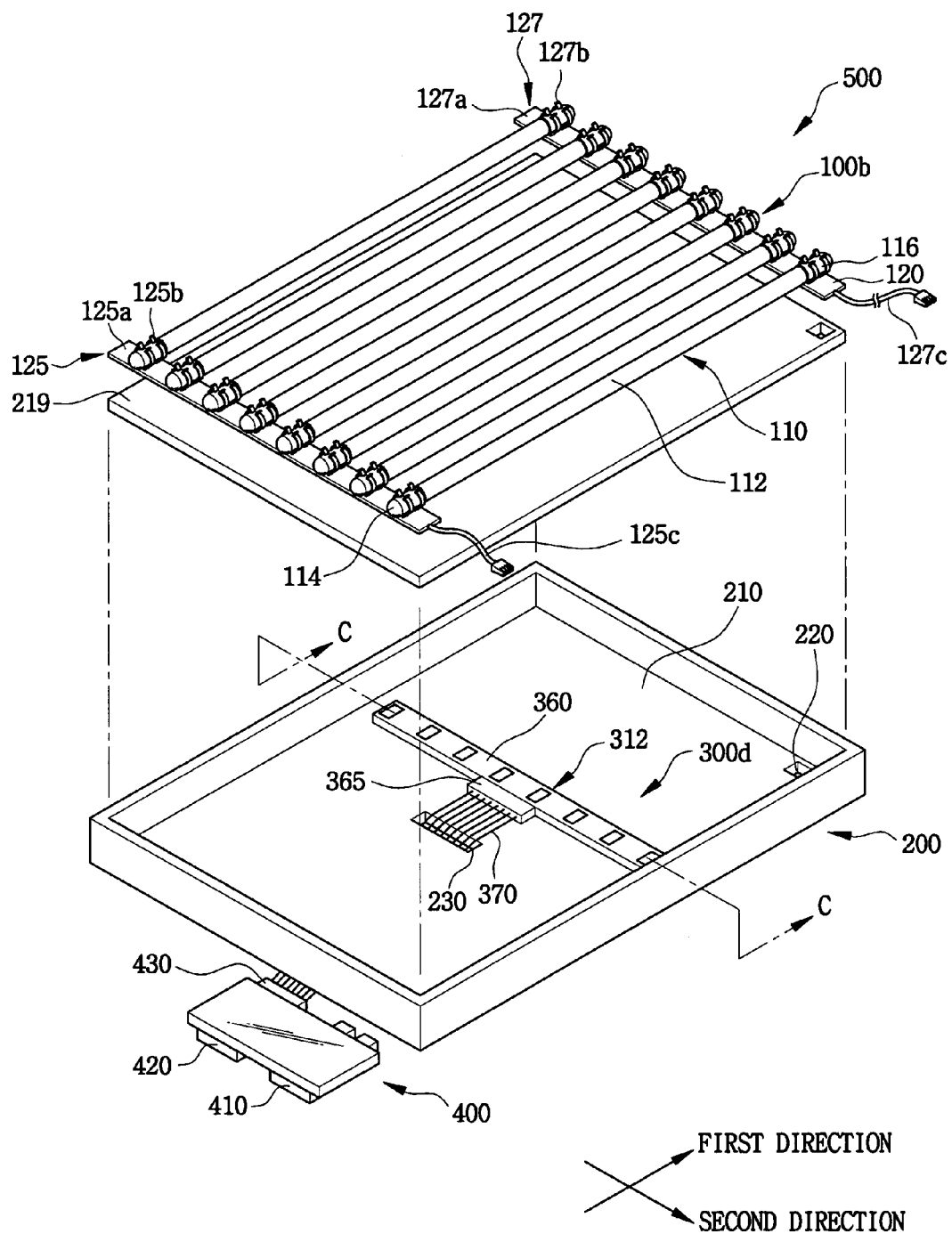
FIG. 6 is an exploded perspective view showing a backlight assembly according to a fourth exemplary embodiment of the present invention.
Figure 7:
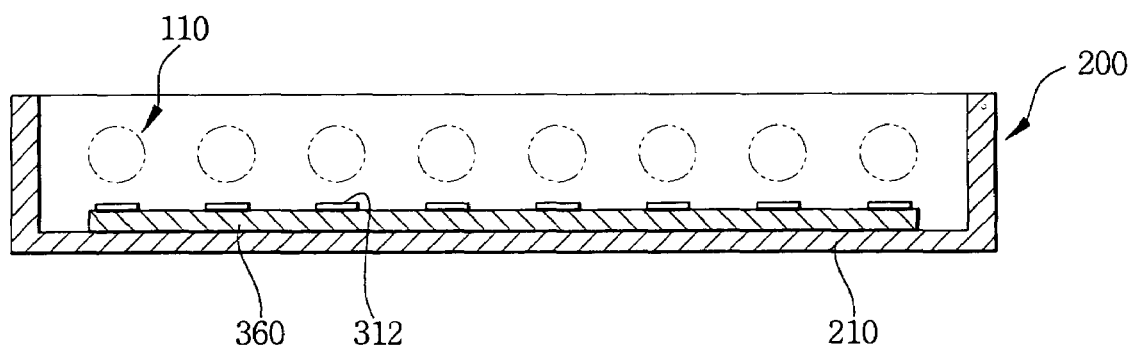
FIG. 7 is cross-sectional view taken along the line C—C of FIG. 6.

FIG. 6 is an exploded perspective view showing a backlight assembly according to a fourth exemplary embodiment of the present invention, and FIG. 7 is cross-sectional view taken along the line C—C of FIG. 6. In the embodiment 4 of the backlight assembly, other elements except the sensors are the same as those of the embodiment 2 of the backlight assembly, the same reference numerals denote the same elements of embodiment 2 of the backlight assembly, and thus the detailed descriptions of the same elements will be omitted.

Referring to FIGS. 6 and 7, the sensors 300d includes a printed circuit board 360, a plurality of conductive members 312 and a signal line 370.

The conductive members 312 are disposed on the printed circuit board. Preferably, the thickness of the printed circuit board 360 may be thin.

One of the conductive members 312 is disposed under the respective lamps 110. There is a one-to-one correspondence between the conductive members 312 and the lamps 110. Each of the conductive members 312 is connected to a circuit pattern formed on the printed circuit board 360.

The printed circuit board 360 is connected to the voltage cut-off module 420 of the inverter through the signal line 370. A first end of the signal line 370 is connected to a first connector 365 that is connected to a circuit pattern formed on the printed circuit board 360, a second end of the signal line 370 is connected to a second connector 430 that is connected to the voltage cut-off module 420 of the inverter 400. For example, the signal lines 370 through which a plurality of sensing signals passes may be disposed on a flexible printed circuit board of which thickness is thin.

Figure 8:
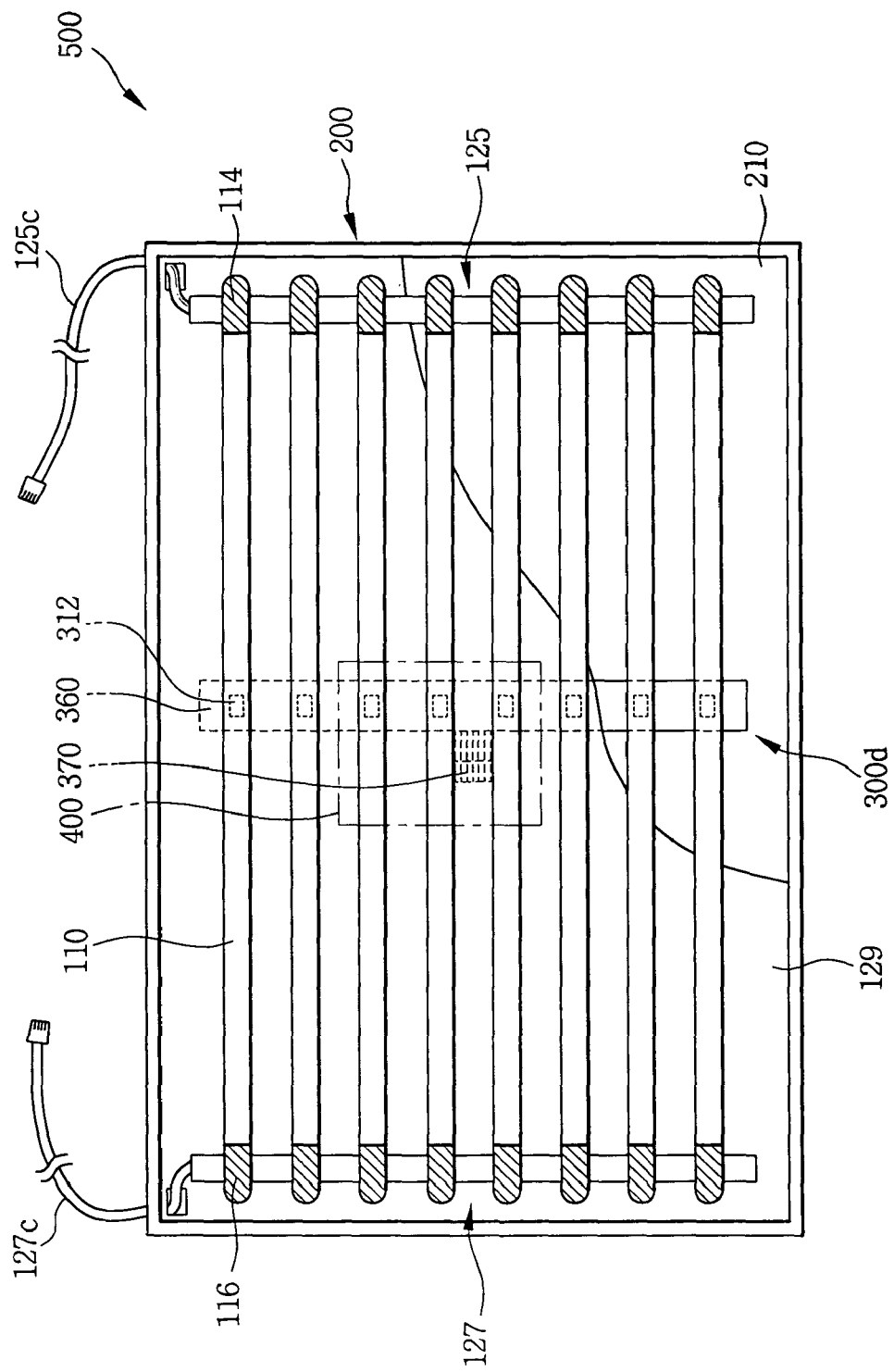
FIG. 8 is a plan view showing the backlight assembly of FIG. 6.

FIG. 8 is a plan view showing the backlight assembly of FIG. 6.

Referring to FIG. 8, the printed circuit board 360 according to the third exemplary embodiment of the present invention may be disposed between the first electrodes 114 of the lamps 110 and the second electrodes 116 of the lamps 110. The printed circuit board 360 may be disposed adjacent to the first electrode 114 or adjacent to the second electrode 116. When the flexible printed circuit board, on which the signal lines 370 are disposed, is employed, the cost for manufacturing the liquid crystal display device increases. Especially, when the distance between the sensors 300d and the inverter 400 increases, the cost for manufacturing the liquid crystal display device greatly increases.

In view of the manufacturing cost, at least one of the sensors 370 overlap with a portion of the inverter 400 to reduce the distance between the sensors 370 and the inverter 400. At least one of the sensors 370 may overlap with the whole inverter 400. The length of the signal line is reduced, so that the cost for manufacturing the liquid crystal display device may be reduced.

Figure 9:
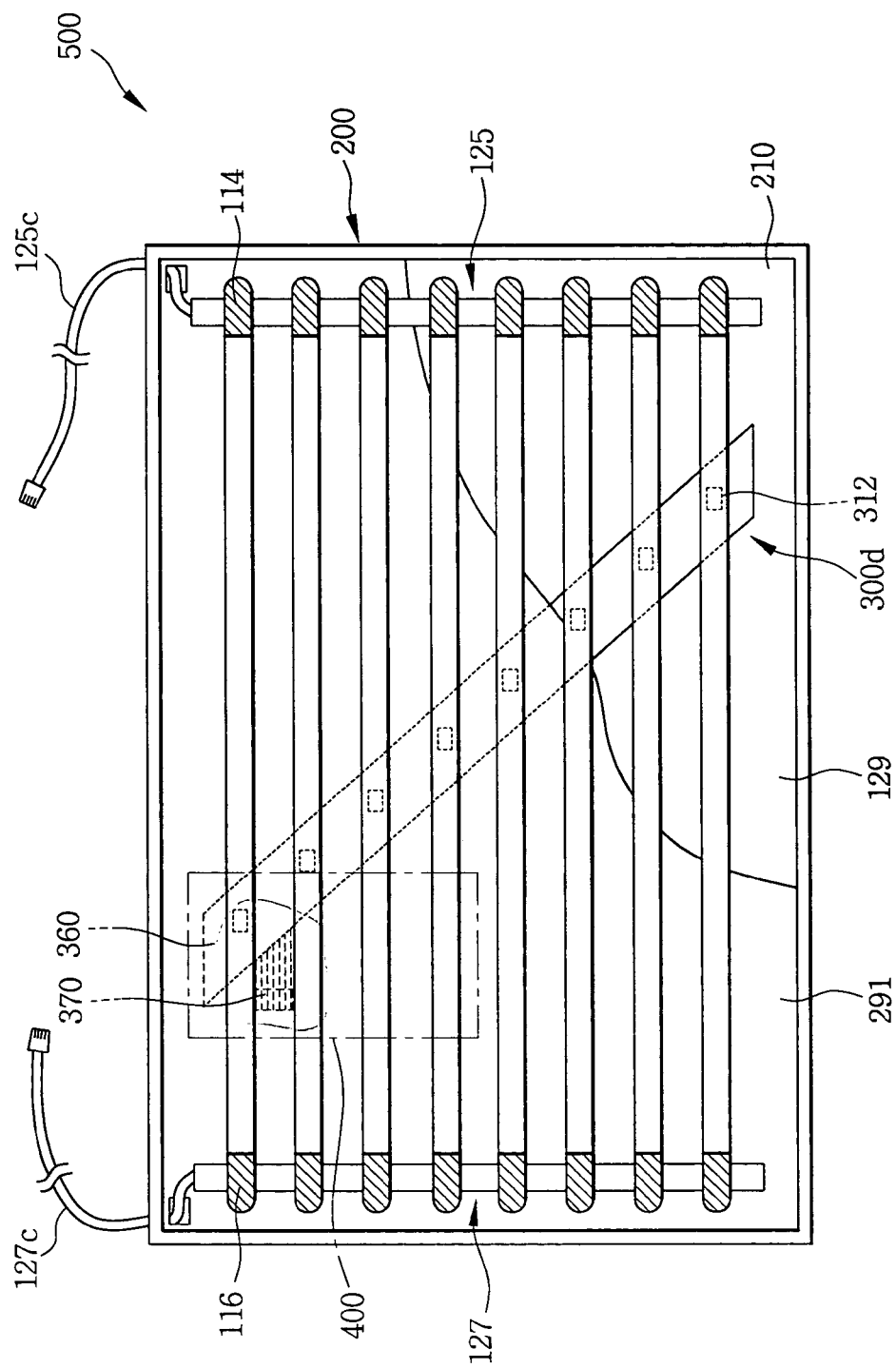
FIG. 9 is a plan view showing another example of a backlight assembly.

FIG. 9 is a plan view showing another example of a backlight assembly.

Referring to FIG. 9, when the printed circuit board 360 does not overlap with the inverter 400, the position of the printed circuit board 360 may be changed so as to reduce the length of the signal line 370.

As shown in FIG. 9, when the inverter is disposed adjacent to the first electrode 114 or adjacent to the second electrode 116, the printed circuit board 360, on which the sensors are disposed, is arranged along an imaginary array line forming a predetermined angle with respect to a longitudinal direction of the lamps.

A first end of the printed circuit board 360 is disposed adjacent to the inverter 400, and a second end of the printed circuit board 360 is disposed far from the inverter. The signal line 370 connects the inverter 400 to the first end of the printed circuit board 360, and reduces the distance between the printed circuit board 360 and the inverter 400, to thereby reduce the length of the signal line 370.

According to above embodiment, the sensors detect the magnetic flux generated from the lamps to output the sensing signal, and the sensors are installed on a printed circuit board so as to detect the operation state of the lamp instead of installing the sensors on the receiving container one by one. Therefore, the installing time required for installing the sensors may be greatly reduced compared with installing the sensors on the receiving container one by one. Although the above preferred embodiment contemplates a structure in which sensors are installed on the printed circuit board, other structure, in which the sensors are installed on a flexible printed circuit board and the flexible printed circuit board is connected to the inverter, may also be utilized.

<Embodiment 5 of Backlight Assembly>

Figure 10:
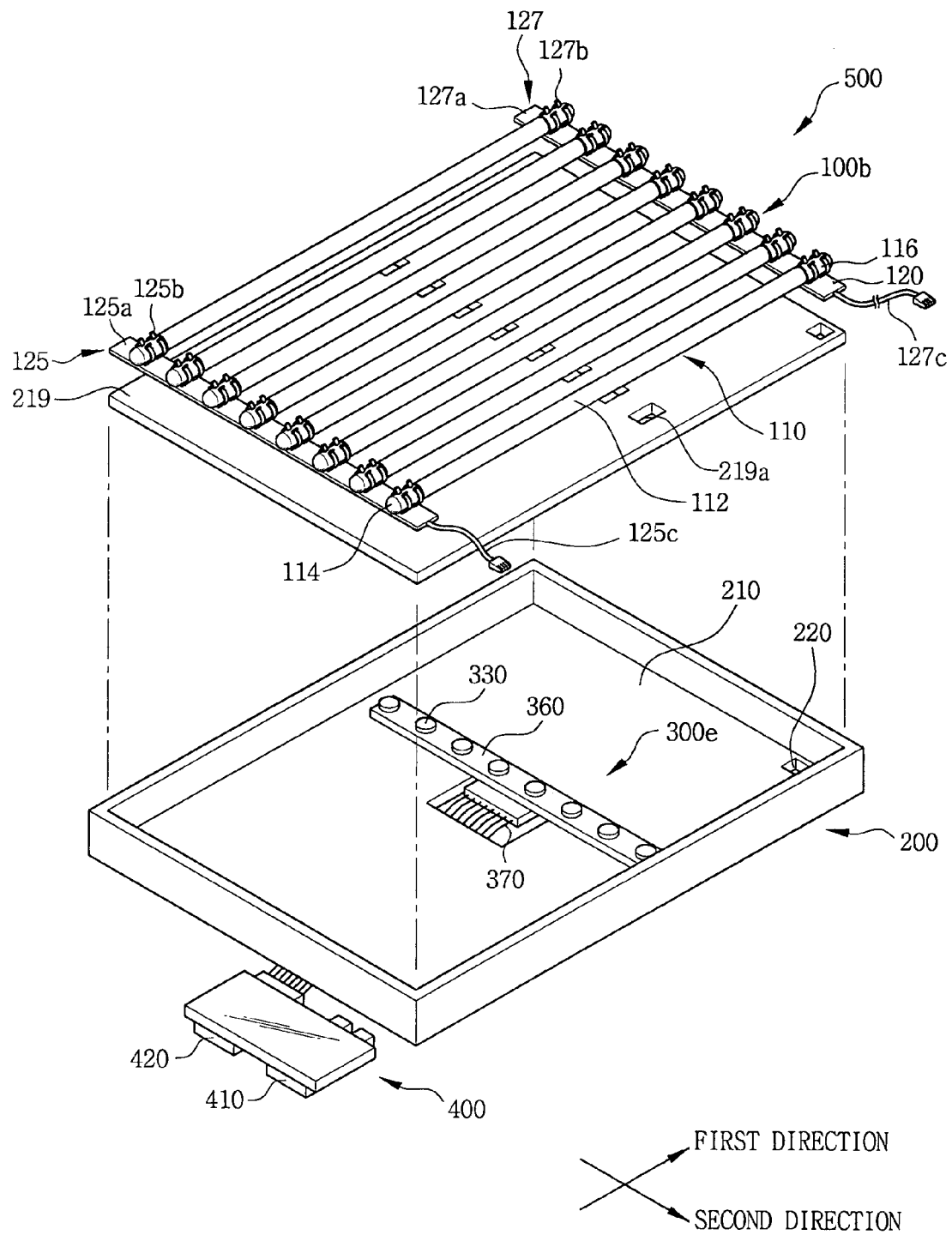
FIG. 10 is an exploded perspective view showing a backlight assembly according to a fifth exemplary embodiment of the present invention.

FIG. 10 is an exploded perspective view showing a backlight assembly according to a fifth exemplary embodiment of the present invention. In the embodiment 5 of the backlight assembly, other elements except the sensors are the same as those of the embodiment 2 of the backlight assembly, the same reference numerals denote the same elements of embodiment 2 of the backlight assembly, and thus the detailed descriptions of the same elements will be omitted.

Referring to FIG. 10, the sensors 300e includes a printed circuit board 360, a plurality of photoelectric devices 330 and a signal line 370. The photoelectric devices 330 are integrated on the printed circuit board 360. One of the photoelectric devices 330 is disposed under the respective lamp 110. The number of the photoelectric devices is the same as that of the lamps. There is a one-to-one correspondence between the photoelectric devices and the lamps.

According to above embodiment, the sensors detect the light generated from the lamps to output the sensing signal, and the sensors are installed on a printed circuit board so as to detect the turn-on or turn-off of the lamp instead of installing the sensors on the receiving container one by one. Therefore, the installing time required for installing the sensors may be greatly reduced compared with installing the sensors on the receiving container one by one.

<An Embodiment of Liquid Crystal Display Device>

Figure 11:
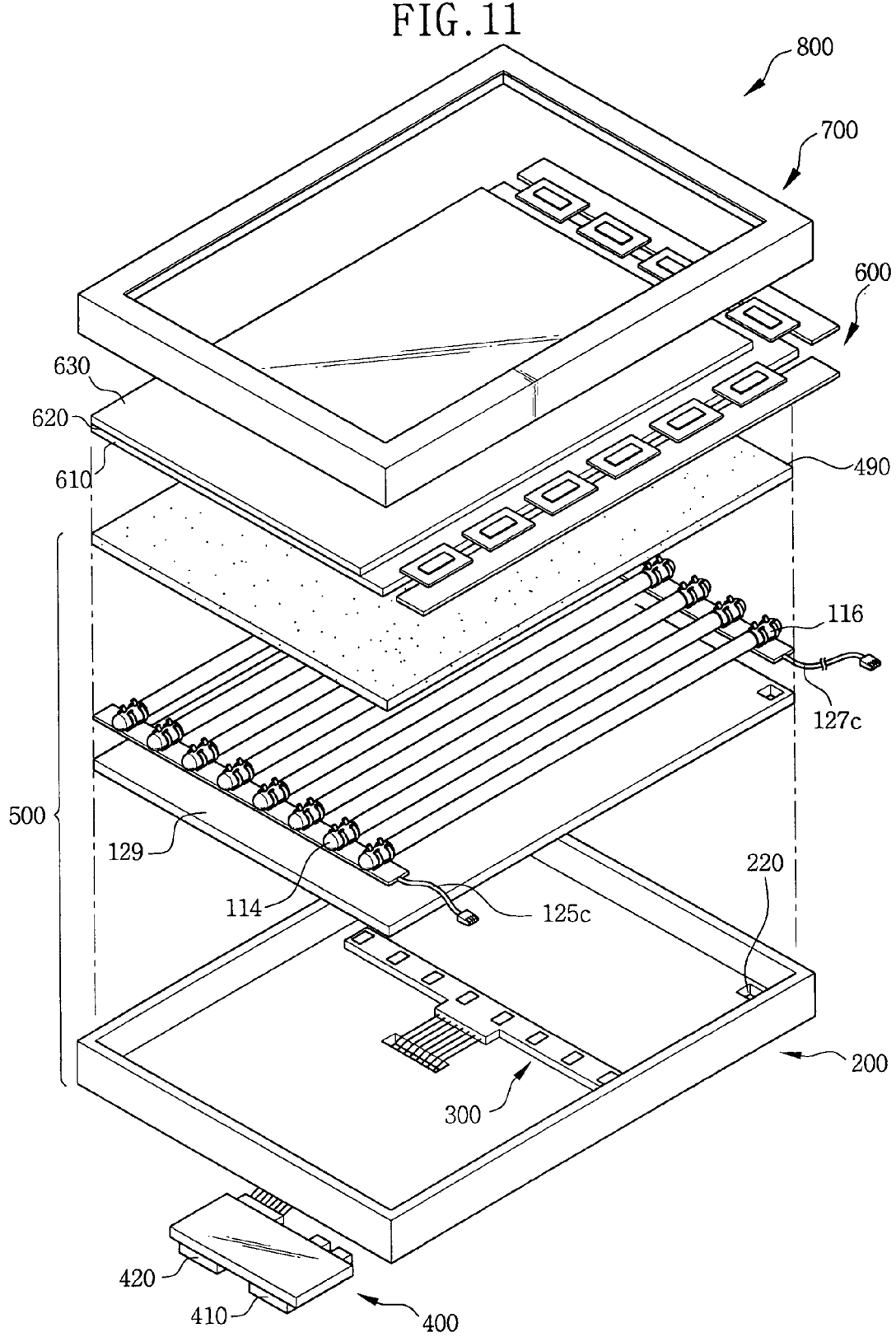
FIG. 11 is an exploded perspective view showing an example of a liquid crystal display device according to the present invention.

FIG. 11 is an exploded perspective view showing an example of a liquid crystal display device according to the present invention. In the embodiment of the liquid crystal display device, other elements except diffusion plate, liquid crystal display panel and chassis are the same as those of the embodiments of the backlight assembly, the same reference numerals denote the same elements of embodiments of the backlight assembly, and thus the detailed descriptions of the same elements will be omitted.

A diffusion plate 490 is further installed over the lamp assembly 100. The diffusion plate 490 changes the luminance distribution of the light generated from the lamp assembly 100 such that the light generated from the lamp assembly 100 has a uniform luminance distribution after passing the diffusion plate 490. Therefore, the bright line due to the lamps may be removed. The diffusion plate 490 is fixed to the receiving container 200.

Referring to FIG. 11, the liquid crystal display panel 600 includes a thin film transistor (TFT) substrate 610, a liquid crystal layer 620 and a color filter substrate 630.

The TFT substrate 610 includes a plurality of thin film transistors and pixel electrodes. The thin film transistors are arranged in a matrix shape on a first transparent substrate.

The color filter substrate 630 faces the TFT substrate 610, and includes a common electrode and color filters formed on a second transparent substrate. The common electrode is formed on an entire surface of the second transparent substrate on which the color filters are formed, and faces the pixel electrode. The color filter are disposed between the common electrode and the second transparent substrate, and disposed over each of the pixel electrodes.

The liquid crystal 630 is disposed between the TFT substrate 610 and the color filter substrate 630. An electric field is formed between the pixel electrode and the common electrode, and thus the amount of the light passing through the liquid crystal layer is regulated. The light generated from the lamp assembly 200 passes through the liquid crystal layer and an image is displayed.

The chassis 700 fixes the liquid crystal display panel 600 to receiving container 200 while the liquid crystal display panel 600 is received in the receiving container 200, such that the receiving container 200 is not detached.

While the exemplary embodiments of the present invention and its advantages have been described in detail, it should be understood that various changes, substitutions and alterations can be made herein without departing from the scope of the invention as defined by appended claims.

What is claimed is:

1. A backlight assembly comprising:
   a lamp assembly including a plurality of lamps, arranged in parallel, to generate a light, a power voltage being applied to the lamps through the lamp assembly;
   a receiving container to receive the lamp assembly, the receiving container including a bottom face and side faces;
   a plurality of sensors, disposed in the receiving container, to detect an operation state of the lamps and to output a plurality of sensing signals, one of the sensors facing a respective lamp;
   an inverter including i) a lamp driving module, disposed outside the receiving container, to provide the lamps with the power voltage, ii) voltage cut-off module comparing the sensing signals with a predetermined reference signal, the voltage cut-off module providing the lamp driving module with a voltage cut-off signal to prevent the lamp driving module from providing the lamps with the power voltage when at least one of the sensing signals has an amplitude smaller than the reference signal.

2. The backlight assembly of claim 1, further comprising a reflection plate, disposed between the sensors and the lamp assembly, to reflect the light.

3. The backlight assembly of claim 1, wherein each of the lamps including a lamp body, a first electrode formed at a first end of the lamp body, and a second electrode formed at a second end of the lamp body, the second end facing the first end.

4. The backlight assembly of claim 1, wherein the lamp assembly further comprises a module through which the power voltage is supplied to the lamps, the module includes a first module and a second module, the first electrode of each of the lamps is connected in parallel to the first module, the second electrode of each of the lamps is connected in parallel to the second module.

5. The backlight assembly of claim 1, wherein the sensors includes a conductive member and a signal line, the conductive member transduces a magnetic flux generated from at least one of the lamps to a current signal to output the sensing signal and is insulated from the receiving container.

6. The backlight assembly of claim 5, wherein the conductive member and the signal line are electrically insulated from the receiving container by an insulation member.

7. The backlight assembly of claim 1, wherein a distance between an outer surface of a first lamp and a first sensor is in a range from about 1 mm to about 5 mm, the first sensor being disposed over the first lamp, and the first lamp being one lamp among the lamps.

8. The backlight assembly of claim 1, further comprising an opening disposed on the bottom face of the receiving container; and
   a connection member that electrically connects the sensors to the inverter, the connection member passing through the opening.

9. The backlight assembly of claim 1, wherein each of the sensors further includes:
   a photoelectric sensor to detect the light generated from at least one of the lamps; and
   a signal line to electrically connect the photoelectric sensor to the inverter.

10. The lamp driving apparatus of claim 8, wherein the photoelectric sensor includes one selected from the group consisting of an amorphous silicon thin film, a phototransistor and a photodiode, and transduces the light generated form at least one of the lamps to a current signal.

11. The backlight assembly of claim 9, further comprising a reflection plate, disposed between the sensors and the lamp assembly, to reflect the light, the reflection plate having a plurality of openings, the openings being disposed over the respective sensors.

12. The backlight assembly of claim 1, wherein each of the sensors includes:
   a printed circuit board;
   a conductive member, disposed on the printed circuit board, to detect a magnetic flux generated from at least one of the lamps and to transduce the magnetic flux to a current signal; and
   a signal line that electrically connects the inverter to the printed circuit board.

13. The backlight assembly of claim 12, wherein the signal line is disposed on a flexible printed circuit board.

14. The backlight assembly of claim 12, wherein at least one of the sensors overlap with a portion of the inverter to reduce a distance between the sensors and the inverter.

15. The backlight assembly of claim 12, wherein the sensors are disposed on the bottom face of the receiving container to be arranged along an array line forming a predetermined angle with respect to a longitudinal direction of the lamps, the inverter is disposed adjacent to an end of the array line to reduce a distance between the sensors and the inverter.

16. The backlight assembly of claim 1, wherein each of the sensors includes:

a printed circuit board;

a photoelectric device, disposed on the printed circuit board, to transduce a light generated from at least one of the lamps to a current signal to output the sensing signal; and a signal line that electrically connects the inverter to the printed circuit board.

17. The backlight assembly of claim 16, further comprising a reflection plate, disposed between the sensors and the lamp assembly, to reflect the light generated from the lamps, the reflection plate having a plurality of openings, each of the openings allowing the light to be incident into at least one of the sensors.

18. A liquid crystal display device comprising:

a backlight assembly including i) a lamp assembly having a plurality of lamps, arranged in parallel, to generate a light, a power voltage being applied to the lamps through the lamp assembly; ii) a plurality of sensors to detect an operation state of the lamps and to output a plurality of sensing signals, one of the sensors facing a respective lamp;

an inverter providing the lamps with the power voltage to turn on the lamps, comparing the sensing signals with a predetermined reference signal, and outputting a voltage cut-off signal to prevent the power voltage from being applied to the lamps when at least one of the sensing signals has an amplitude smaller than the reference signal; and a liquid crystal display panel that changes the light into an image to display the image.

19. The liquid crystal display device of claim 18, wherein the sensors includes a conductive member, and the conductive member transduces a magnetic flux generated from at least one of the lamps to a current signal to output the sensing signal.

20. The liquid crystal display device of claim 18, wherein the sensors includes a photoelectric device and a signal line, the photoelectric device transduces the light generated from at least one of the lamps to a current signal to output the sensing signal, and the signal line connects the photoelectric device to the inverter.

21. The liquid crystal display device of claim 18, wherein the sensors are disclosed on a printed circuit board, and the sensing signal is applied to the inverter through a flexible circuit board.

22. The liquid crystal display device of claim 18, wherein the inverter includes:

a lamp driving module that provides the lamps with the power voltage to turn on the lamps; and a voltage cut-off module comparing the sensing signals with the predetermined reference signal, the voltage cut-off module providing the lamp driving module with the voltage cut-off signal to prevent the lamp driving module from providing the lamps with the power voltage when at least one of the sensing signals has the amplitude smaller than the reference signal.

* * * * *